United States Patent
Takenaka et al.

(10) Patent No.: US 9,350,952 B2
(45) Date of Patent: May 24, 2016

(54) DRIVE VIDEO RECORDING DEVICE AND METHOD, DRIVE VIDEO RECORDING SYSTEM, AND SUMMARIZED MOVING IMAGE CREATING DEVICE

(71) Applicant: DENSO CORPORATION, Kariya, Aichi-pref. (JP)

(72) Inventors: Kazuhito Takenaka, Obu (JP); Takashi Bando, Nagoya (JP); Takayuki Miyahara, Kariya (JP)

(73) Assignee: DENSO CORPORATION, Kariya (JP)

( * ) Notice: Subject to any disclaimer, the term of this patent is extended or adjusted under 35 U.S.C. 154(b) by 381 days.

(21) Appl. No.: 13/948,235

(22) Filed: Jul. 23, 2013

(65) Prior Publication Data

US 2014/0028848 A1 Jan. 30, 2014

(30) Foreign Application Priority Data

Jul. 26, 2012 (JP) .................................. 2012-166163

(51) Int. Cl.
| | |
|---|---|
| *H04N 5/917* | (2006.01) |
| *H04N 9/80* | (2006.01) |
| *H04N 7/18* | (2006.01) |
| *G07C 5/08* | (2006.01) |
| *G11B 27/034* | (2006.01) |
| *G11B 27/28* | (2006.01) |

(52) U.S. Cl.
CPC ................ *H04N 7/18* (2013.01); *G07C 5/0866* (2013.01); *G11B 27/034* (2013.01); *G11B 27/28* (2013.01)

(58) Field of Classification Search
USPC .................. 386/200–234, 239–248, 343–352
See application file for complete search history.

(56) References Cited

U.S. PATENT DOCUMENTS

| | | | |
|---|---|---|---|
| 2008/0069516 A1 | 3/2008 | Takahashi et al. | |
| 2009/0300143 A1* | 12/2009 | Musa ................. | H04N 7/17318 709/218 |
| 2010/0171829 A1* | 7/2010 | Yago .................... | G07C 5/0891 348/143 |
| 2011/0057783 A1* | 3/2011 | Yagi ......................... | B60R 1/00 340/436 |

FOREIGN PATENT DOCUMENTS

| | | | |
|---|---|---|---|
| JP | H08-251540 A | | 9/1996 |
| JP | 2005-252372 A | | 9/2005 |
| JP | 2009-246503 A | * | 10/2009 |
| JP | 2010-148053 A | | 7/2010 |
| JP | 2011-146860 A | | 7/2011 |
| WO | 2006/064749 A1 | | 6/2006 |
| WO | 2010/150348 A1 | | 12/2010 |

OTHER PUBLICATIONS

Office Action mailed Jun. 24, 2014 issued in corresponding JP patent application No. 2012-166163 (and English translation).

(Continued)

*Primary Examiner* — Hung Dang
(74) *Attorney, Agent, or Firm* — Posz Law Group, PLC

(57) ABSTRACT

A drive video recording device is provided. The drive video recording device creates a summarized moving image in which the inputted video is culled such that a playback speed of the video of the time period during which the amount of information is smaller is faster than a playback speed of the video of the time period during which the amount of information is larger, and stores the summarized moving image in a storage section.

20 Claims, 5 Drawing Sheets

(56) References Cited

OTHER PUBLICATIONS

Fox et al. "The Sticky HDP-HMM: Bayesian Nonparametric Hidden Markov Models with Persistent States." Technical Report P-2777; Nov. 5, 2007; pp. 1-59; MIT Laboratory for Information & Decision Systems.

Mochihashi et al. "Baesian Unsupervised Word Segmentation with Nested Pitman-Yor Language Modeling." Proceedings of the Joint Conference on Natural Language Processing of the AFNLP; 2009; pp. 100-108; vol. 1; NTT Communication Science Laboratories; Kyoto, Japan.

Taniguchi et al. "Unsupervised Segmentation of Human Motion Data Using Sticky HDP-HMM and MDL-based Chunking Method for Imitation Learning." Advanced Robotics; 2011; pp. 2143-2172; vol. 25 (17); Japan.

Taniguchi et al. "Double Articulation Analyzer for Unsegmented Human Motion using Pitman-Yor Language Model and Infinite Hidden Markov Model." 2011 IEEE/SICE International Symposium on System Integration; 2011.

\* cited by examiner

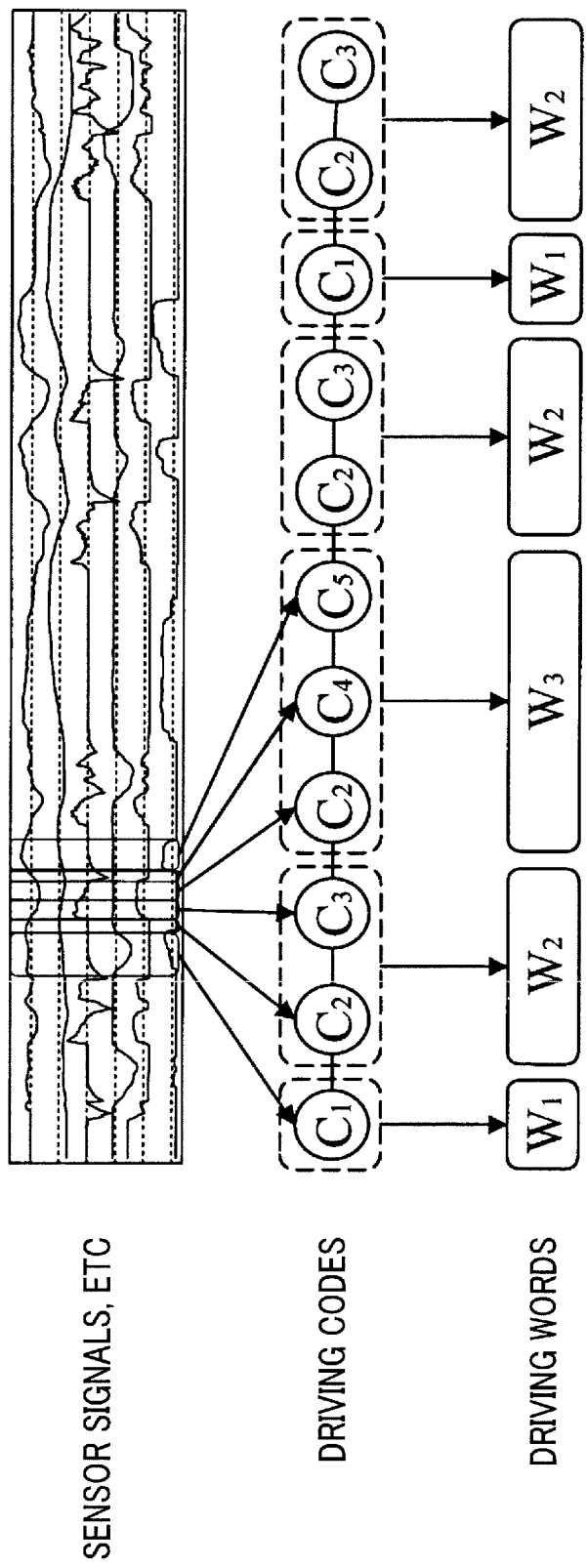

DRIVING WORD SEGMENTATION CANDIDATES

CHANGING LOCATIONS OF DRIVING WORDS

HISTOGRAM OF CHANGING LOCATIONS

ULTIMATE SEGMENTATION OF DRIVING WORDS

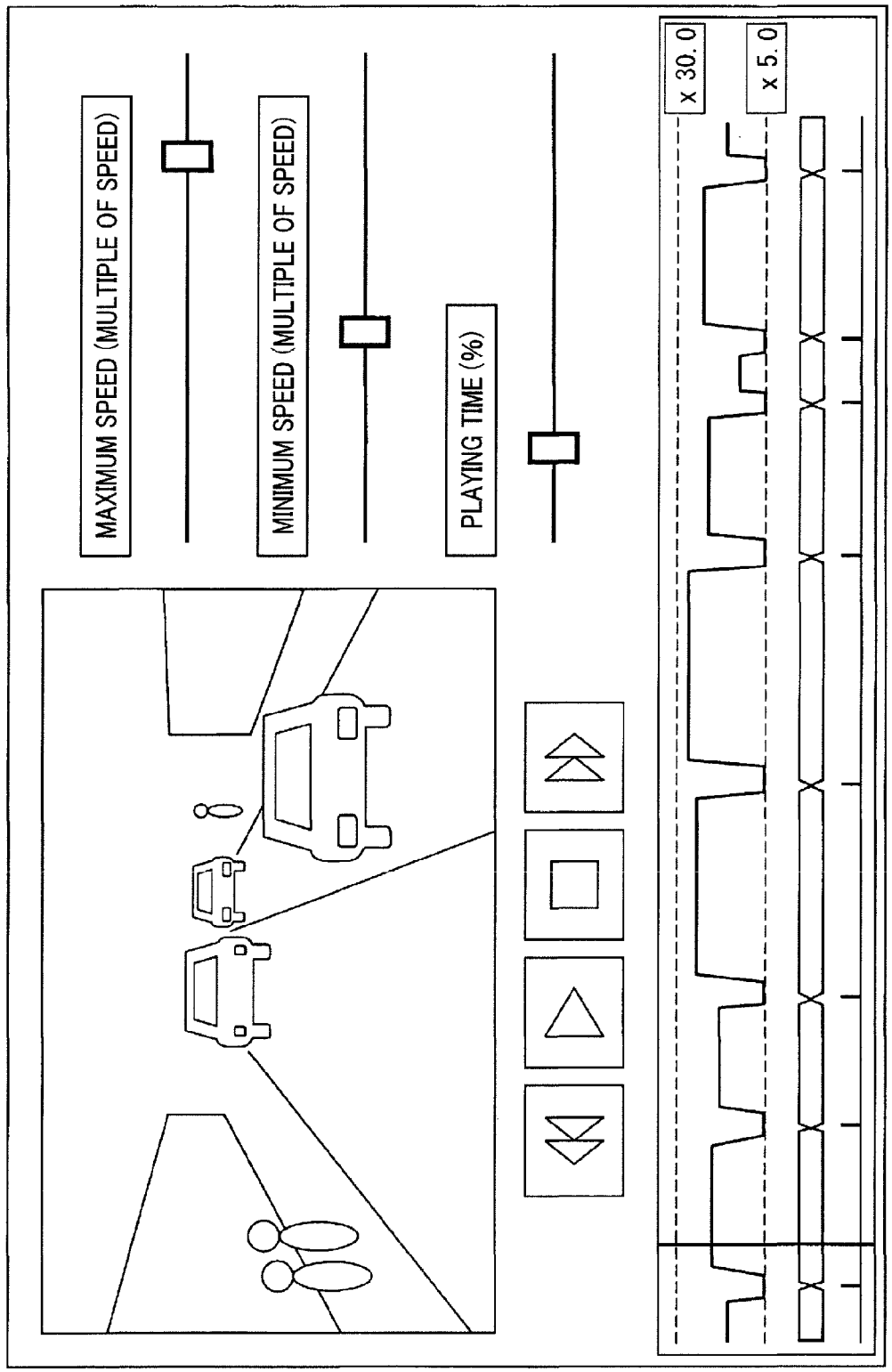

DRIVE VIDEO RECORDING DEVICE AND METHOD, DRIVE VIDEO RECORDING SYSTEM, AND SUMMARIZED MOVING IMAGE CREATING DEVICE

CROSS-REFERENCE TO RELATED APPLICATION

This application is based on and claims the benefit of priority from earlier Japanese Patent Application No. 2012-166163 filed Jul. 26, 2012, the description of which is incorporated herein by reference.

BACKGROUND OF THE INVENTION

1. Technical Field

The present invention relates to a drive video recording device and system that records a drive video showing the surrounding environment of a vehicle.

2. Description of the Related Art

In JP-A-2011-146860, a device is described that is capable of playing back images captured by an on-board camera such that images having a low priority of necessity for a user are skipped. Therefore, in the device described in JP-A-2011-146860, the acquired image data is stored in an image storage device. In addition, as information serving as reference for skipping parts of and displaying the stored image data in a display device, information (such as brake pedal force, accelerator pedal force, vehicle speed, steering angle, front/back acceleration, and lateral acceleration) correlated with the time at which the images have been captured is also stored in the storage device.

When the images are played back, information at a skip-start time set by the user by a setting switch and subsequent pieces of information are successively compared, starting with the pieces of information closest to the information at the skip-start time in terms of time. The degrees of similarity are calculated. The image data stored in the storage device is displayed in the display device such that the images are skipped until the degree of similarity reaches a predetermined threshold or below, based on the calculation results for the degree of similarity.

In addition, in JP-A-2009-246503, a device is described that correlates a video captured during a drive route with map information, and stores the video and map information as a summary of the video. The device enables the video to be checked as necessary. Specifically, when the change in traveling direction of the vehicle is a predetermined amount or greater, or when a road sign containing characters or symbols set in advance is detected in a drive video captured by an on-board camera, the relevant drive video is extracted from a drive video that is being constantly recorded. The extracted drive video is then stored in a storage section together with the name of the location and coordinate information composed of the latitude and longitude. Then, when an instruction for summary display is given, a composite image combining the map information to the destination of the vehicle and a plurality of stored videos is displayed.

The device in JP-A-2011-146860 is capable of playing back images such that images having a low degree of necessity for a user are skipped. Therefore, when the user checks the necessary image data, the recorded image data is not required to be played back over a long period of time. However, in this device, the image data acquired by the on-board camera is stored directly into the image storage device. Therefore, a memory having a large storage capacity is required to be used as the image storage device. Furthermore, a problem occurs in that the amount of time over which image data can be recorded is limited to a relatively short amount of time.

In this respect, in the device in JP-A-2009-246503, only the drive video of an instance in which a predetermined condition is met is extracted and stored. Therefore, the storage capacity required for recording the drive video can be reduced. However, on the other hand, drive videos other than those of instances in which predetermined conditions are met are deleted without being stored. Therefore, the state of the overall vehicle travel cannot be checked through the drive video.

Therefore, a drive video recording device and system are desired that are capable of allowing the state of the overall vehicle travel to be checked through a drive video and capable of reducing the storage capacity required for recording the drive video from that required in the past.

SUMMARY

As an exemplary embodiment, the present application provides a drive video recording device including: a video encoding section that encodes a video indicating a surrounding environment of the vehicle, wherein the video is continuously captured by an imaging device mounted in a vehicle and inputted thereto; a first storage section for storing the encoded video; a second storage section; and a vehicle state collecting section that collects information related to vehicle states including at least one of operations by a driver, the behavior of the vehicle, and the state of the driver. The drive video recording device also includes a summarized moving image creating and recording section that identifies time periods during which the inputted amount of information is larger and time periods during which the amount of information is smaller as vehicle states in the video stored in the first storage section, creates a summarized moving image in which the inputted video is culled such that a playback speed of the video of the time period during which the amount of information is smaller is faster than a playback speed of the video of the time period during which the amount of information is larger, and stores the summarized moving image in the second storage section.

In the drive video recording device of the exemplary embodiment, a summarized moving image is recorded that is created by the continuously captured original moving image being culled. Therefore, a drive video of the overall vehicle travel can be checked through the summarized moving image. In addition, the storage capacity for recording the summarized moving image can be reduced from that in the past. Furthermore, in the present configuration, when the original moving image is culled and the summarized moving image created, the playback speed of the time period during which the amount of information is larger as a vehicle state is made relatively slow, and the playback speed of the time period during which the amount of information is smaller is made relatively fast. Therefore, during playback of the summarized moving image, vehicle states that are considered important can be played back relatively slowly with emphasis. Inspection of such vehicle states and the like can be facilitated.

In addition, as an exemplary embodiment, the present application provides a drive video recording system including: an information detecting device that detects at least one type of information related to vehicle states including at least one type of operations by a driver, the behavior of a vehicle, and the state of the driver; an imaging device that is provided in the vehicle and continuously captures a video indicating the surrounding environment of the vehicle; and a drive video recording device. The drive video recording device includes: a video encoding section that encodes a video that is captured by the imaging device and inputted, the video indicating the surrounding environment of the vehicle; a first storage section for storing the encoded video; a second storage section; a code string generating section that generates a code string by grouping the information continuously and chronologically detected by the information detecting device per vehicle state serving as a grouping unit, and expressing the vehicle states using codes corresponding to the vehicle states; and a segmenting section that segments the code string generated by the code string generating section into driving words expressing predetermined driving states. From the string of driving words segmented by the segmenting section, time periods during which the amount of information is larger and time periods during which the amount of information is smaller are identified as vehicle states. A summarized moving image is created in which the video captured by the imaging device is culled such that a playback speed of the video of the time period during which the amount of information is smaller is faster than a playback speed of the video of the time period during which the amount of information is larger. The summarized moving image is recorded in the second storage section.

In the drive video recording system of the exemplary embodiment, first, based on at least one type of information related to the vehicle states including the operations by the driver, the behavior of the vehicle, and the state of the driver, the information is grouped per vehicle state serving as a grouping unit. In other words, with the various vehicle states identified from the information as clusters in a space in which the detected information is a dimension, the continuously and chronologically detected pieces of information are statistically processed into the cluster to which they belong. As a result, the pieces of information are grouped per vehicle state that is a grouping unit (in other words, per cluster). Furthermore, a code string is generated by the grouped information being expressed by a code corresponding to the vehicle state identified by the grouped information (or in other words, the cluster to which the grouped information belongs).

As described above, each of the grouped information includes information related to at least one of the operations by the driver, the behavior of the vehicle, and the state of the driver. Therefore, when the driver of the vehicle changes the operating state of the accelerator, the brake, the steering wheel, and the like in adherence to the surrounding traffic conditions or the driver's own intentions, the information related to the operations by the driver and the behavior of the vehicle resulting from the operations changes depending on the changes in the operating state made by the driver. In addition, when the driver changes the operating state, the state of the driver (such as the direction of the driver's line-of-sight, and the driver's expression and heart rate) also changes depending on the changes in the operating state. Therefore, when the pieces of grouped information are expressed by corresponding codes, the obtained code string adheres to the changes in operation performed by the driver.

Each code in the code string generated in this way, alone or as a group, forms a driving word expressing a predetermined driving state (such as start-up, stop, constant-speed cruising, turning at a curve, right-turn or left-turn at an intersection, and lane change to the right lane or the left lane). Therefore, the string of driving words obtained by segmentation of the generated code string into driving words expressing predetermined driving states indicates the changes in the driving state and the transitions in a driving scene of the vehicle.

In this way, from the above-described string of driving words, the changes in the driving state, the transitions in the driving scene, and the length of time during which the same driving state continues can be known. As a result, the time periods during which the amount of information is larger and the time periods during which the amount of information is smaller can be identified as vehicle states. The summarized moving image is created in which the video captured by the imaging device is culled such that the playback speed of the video of the time period during which the amount of information is smaller is faster than the playback speed of the video of the time period during which the amount of information is larger. The summarized moving image is then recorded. Therefore, in the above-described drive video recording system, the storage capacity for recording the summarized moving image can be reduced from that of the past while enabling a drive video of the overall vehicle travel to be checked.

Features other than those described above will become clear from the following description of the embodiment and accompanying drawings.

BRIEF DESCRIPTION OF THE DRAWINGS

In the accompanying drawings:

FIG. 2 shows a conceptual diagram of a process by which driving codes are generated from signals indicating pieces of information related to a vehicle state, and the driving code string is segmented into driving words;

FIG. 5 shows an example of a diagram of a moving-image summary application using the drive video recording system according to the embodiment.

DETAILED DESCRIPTION OF THE PREFERRED EMBODIMENTS

Figure 1:
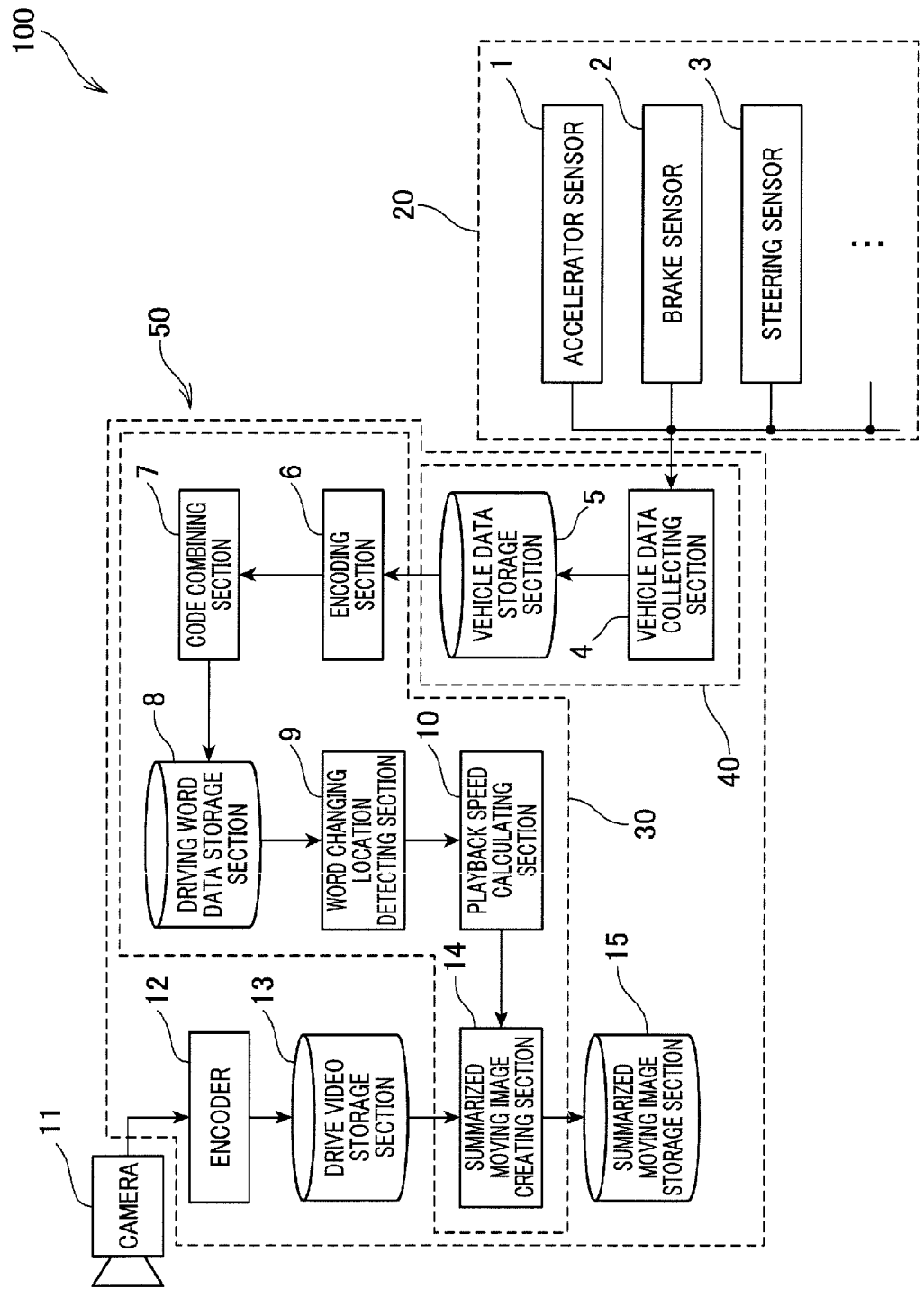
FIG. 1 shows a configuration diagram of a drive video recording system according to an embodiment.

A drive video recording system according to an embodiment of the present invention will hereinafter be described in detail with reference to the drawings. FIG. 1 is a configuration diagram showing a configuration of a drive video recording system 100 including sensors 1 to 3 and a camera 11. In the configuration diagram, the configuration of the drive video recording system 100 is functionally expressed by a functional block diagram. In the drive video recording system 100, sections other than the sensors 1 to 3 and the camera 11 serve as a drive video recording device 50. Within the drive video recording device 50, sections other than a drive video storage section 13 and a summarized moving image storage section 15 can be actualized by hardware or software as an electronic control unit centered around a central processing unit (CPU) (not shown). The electronic control unit includes an interface, a read-only memory (ROM), a random access memory (RAM), and the like. Data input and output is performed to and from external devices (1 to 3, 11, 13, and 15) through the interface. The ROM stores in advance therein a control program and data required to run the control program. The RAM is a work area of the CPU. The electronic control unit can be configured by a circuit board on which a plurality of chips are mounted. Alternatively, the electronic control unit can be configured by a single-chip integrated circuit.

As shown in FIG. 1, the drive video recording system 100 has at a least one sensor that detects any of information related to driving operations by a driver, information related to the behavior of the vehicle occurring as a result of the driving operations, and information related to the state of the driver. FIG. 1 shows an example in which an accelerator sensor 1, a brake sensor 2, and a steering sensor 3 are included as the sensors for detecting information related to the driving operations by the driver. The accelerator sensor 1 detects the amount by which the accelerator pedal is depressed. The brake sensor 2 detects the amount by which the brake pedal is depressed or the brake pressure generated by the master cylinder. The steering sensor 3 detects a steering angle of the steering wheel.

However, the sensor for detecting information related to the driving operations by the driver is not limited to the above-described sensors 1 to 3. For example, a turn signal switch for operating a turn signal (blinker) or a position sensor that detects the transmission shift position may be used. Furthermore, in addition to or instead of the sensor for detecting information related to the driving operations by the driver, a vehicle sensor that detects information related to the behavior of the vehicle may be used. Examples of the vehicle sensor such as this include a speed sensor that detects the traveling speed of the vehicle, a front/back acceleration sensor that detects acceleration in the front/back direction of the vehicle, a lateral acceleration sensor that detects acceleration in the lateral direction of the vehicle, and the like. Moreover, in addition to or instead of the sensor for detecting information related to the driving operations by the driver and/or the sensor for detecting information related to the behavior of the vehicle, a sensor that detects information related to the state of the driver may be used. Examples of a sensor such as this include a heart rate sensor that detects the heart rate of the driver, a line-of-sight sensor that detects the driver's line-of-sight, an in-cabin camera that detects the driver's expression, and the like.

Furthermore, not all of the above-described various sensors and switches are required to be included as the sensors for detecting information related to the driving operations by the driver, information related to the behavior of the vehicle, and information related to the state of the driver. Only some of the sensors and switches may be provided.

A vehicle data collecting section 4 receives detection signals from the sensor (various sensors) that detects at least one of information related to the driving operations by the driver, information related to the behavior of the vehicle occurring as a result of the driving operations, and information related to the state of the driver. The vehicle data collecting section 4 collects and stores the detection signals in a vehicle data storage section 5. The vehicle data collecting section 4 is specifically configured by a predetermined interface. In addition, the vehicle data storage section 5 can be configured by a RAM. In this instance, the vehicle data collecting section 4 not only merely stores the detection signals from the sensor in the vehicle data storage section 5, but also calculates derivative information equivalent to the derivative of the information related to the operations by the driver, the behavior of the vehicle, and the state of the driver. The vehicle data collecting section 4 then stores the derivative information in the vehicle data storage section 5 together with the detection signals.

For example, in an instance in which the steering sensor 3 is provided as a sensor, the vehicle data collecting section 4 calculates a steering speed as a signed (i.e. + or −) value indicating the steering direction. The steering speed is the derivative information of the steering angle detected by the steering sensor 3. In an instance in which the accelerator sensor 1 or the brake sensor 2 is provided as a sensor, the vehicle data collecting section 4 calculates a depression speed as a signed (i.e. + or −) value indicating increased depression or reduced depression. The depression speed is equivalent to the derivative information and is calculated from the amount by which the accelerator pedal is depressed or the amount by which the brake pedal is depressed In an instance in which only the speed sensor is provided as a sensor, the vehicle data collecting section 4 is required to calculate acceleration that is the derivative information of the detected speed. However, in an instance in which both the speed sensor and the front/back acceleration sensor are provided, the front/back acceleration sensor can detect the acceleration that is the derivative information of speed. Therefore, the vehicle data collecting section 4 is not required to calculate the derivative information. In addition, the vehicle data collecting section 4 may simply calculate a difference value as the derivative information, rather than the derivative itself of the detection value from the each sensor.

In this way, through use of the derivative information of the information related to the operations by the driver, the behavior of the vehicle, and the state of the driver, the trend of changes in the vehicle state resulting from the operations by the driver can be appropriately expressed by codes. In other words, it is not only the magnitude that is the important information regarding the driving operations of the vehicle and the behavior of the vehicle. The trend of the changes also becomes important. For example, when the steering wheel is being steered such that the steering angle increases in the rightward direction, the vehicle is increasingly turning in the rightward direction. Conversely, when the steering wheel is being returned to its neutral position, the vehicle is being released from the turn and begins to travel straight ahead. This similarly applies to the operation of the accelerator pedal and the brake pedal. The behavior of the vehicle completely differs depending on whether the pedal depression is being increased or decreased in spite of the equivalent degrees of the pedal depression. In addition, the behavior of the vehicle also differs depending on whether the speed is increasing or decreasing. The behavior of the vehicle and the like also often differ between when the driver's line-of-sight shifts from the direction straight ahead to the leftward/rightward direction and when the line-of-sight returns to the direction straight ahead. When the derivative is used, such trends in changes can be expressed as information.

The drive video recording system 100 may include, in addition to the above-described sensors, a surrounding environment sensor, an in-vehicle environment sensor, a global positioning system (GPS) receiver, a road information database, and the like. As the surrounding environment sensor, for example, a radar device that measures the distance to a vehicle traveling ahead or an obstacle can be used. The radar device is used to detect the presence of a preceding vehicle, and the distance to the preceding vehicle when one is present. In addition, as the in-vehicle environment sensor, for example, a microphone that measures the sound within the vehicle can be used. The microphone is used to detect the occurrence of conversation within the vehicle cabin, and the content of the conversation when one occurs. In addition, through use of the GPS receiver and the road information database, the conditions of the road on which the vehicle is traveling can be known. For example, whether the road on which the vehicle is traveling is a highway or a local street, whether the road has a plurality of lanes or only a single lane, whether an intersection or a branching point is present ahead of the traveling position of the vehicle, and the like can be known. The information obtained from the surrounding environment sensor, the in-vehicle environment sensor, the GPS receiver, and the road information database such as these significantly affect the driving state of the vehicle and the state of the driver. Therefore, through use of such information as well, accuracy when grouping signals for each vehicle state and accuracy when segmenting driving words can be enhanced.

As shown in FIG. 2, based on the signals continuously and chronologically detected by the various sensors 1 to 3 and the like that have been collected by the vehicle data collecting section 4 and stored in the vehicle data storing section 5, an encoding section 6 groups the signals per vehicle state serving as a grouping unit. The encoding section 6 generates a code string by expressing the vehicle states identified by the grouped signals using driving codes (driving codes: $C_1$, $C_2$, $C_3$, $C_4$, $C_5$, ... ). In other words, with the various vehicle states identified from the signals as clusters in a space in which the inputted signals are a dimension, the encoding section 6 statistically processes each signal combination into the cluster to which it belongs. As a result, the encoding section 6 groups the signals that change over time per vehicle state that is a grouping unit (in other words, per cluster). Furthermore, the encoding section 6 generates a code string by expressing the grouped signals by a code ($C_1$, $C_2$, $C_3$, $C_4$, $C_5$, ... ) corresponding to the cluster to which the signal combination belongs.

According to the present embodiment, the Hierarchical Dirichlet Process Hidden Markov Model (referred to, hereinafter, as HDP-HMM) is used as the encoding section 6. The HDP-HMM is a model expressed by hidden states and stochastic transitions between the hidden states. The HDP-HMM is flexible in that the number of hidden states is decided based on the inputted signals, as a result of an infinite order of hidden states (equivalent to clusters) being assumed in the Hidden Markov Model (HMM). Therefore, when HMM is used, the number of hidden states is not required to be designed in advance. In particular, a sticky HDP-HMM is preferably used as the HDP-HMM. In the sticky HDP-HMM, bias is added to the self-transition probability of the HDP-HMM. Excessive transition among the hidden states can be suppressed by the self-transition probability being increased. Modeling that assumes continuity of variables can be efficiently performed. The hidden states are used as the driving code.

The HDP-HMM and the sticky HDP-HMM are described in detail in, for example, "Unsupervised Segmentation of Human Motion Data Using Sticky HDP-HMM and MDL-based Chunking Method for Imitation Learning" (Advanced Robotics, Vol. 25 (17), 2143-2172 [2011]). Therefore, further description thereof is omitted.

However, the encoding section 6 is not limited to the above-described HDP-HMM. The code string can be generated using other models. For example, models such as a typical HMM, an N-order Markov Model, a Hierarchical Markov Model, a switching autoregressive (AR) model, and a Switching Kalman Filter, can also be used. In this instance, the number of hidden states in each model is designed in advance. The hidden state parameters and the transition probabilities between the hidden states are calculated in advance based on the number of hidden states. Alternatively, the hidden state parameters and the transition probabilities between the hidden states are successively updated. Then, based on the hidden state parameters and the transition probabilities between the hidden states, the posterior probability of the hidden states is calculated. As a result, the most probable hidden state (cluster) can be obtained.

Furthermore, the following method may be used as a simpler method of generating the code string without using the above-described models. In other words, a threshold value for classifying the magnitude of the signal is set in advance for each signal indicating the information that has been continuously detected in sequence. Furthermore, a different driving code is associated with each combination of all classifications of the signal magnitude. The code string is then generated by a process being repeatedly performed in which judgment is made regarding the classification to which the magnitude of the detected signal belongs, and a driving code corresponding to the combination of classifications is added.

Each driving code in the code string outputted from the encoding section 6 is equivalent to a phoneme in language. Individual driving codes alone do not express a meaningful driving state. In other words, to enable the code string of driving codes to express meaningful driving states, the code string of driving codes is required to be appropriately combined. A code combining section 7 is provided for this purpose.

As shown in FIG. 2, the code combining section 7 segments the code string outputted from the encoding section 6 into driving words expressing predetermined driving states (driving words: $W_1$, $W_2$, $W_3$, ... ). In other words, the code combining section 7 segments the code string such that each code, alone or as a group, expresses a predetermined driving state (such as start-up, stop, constant-speed cruising, turning at a curve, right-turn or left-turn at an intersection, and lane change to the right lane or the left lane). For example, in the example shown in FIG. 2, a driving code $C_1$ by itself is replaced with a driving word $W_1$. Driving codes $C_2$ and $C_3$ are combined and become a driving word $W_2$. Furthermore, driving codes $C_2$, $C_4$, and $C_5$ become a driving word $W_3$. In this way, the string of driving words obtained by segmentation into driving words expressing predetermined driving states indicates the changes in the driving state and the transitions in the driving scene of the vehicle.

According to the present embodiment, the Nested Pitman-Yor Language Model (NPYLM) is used as the code combining section 7. The NPYLM is an example of an unsupervised chunking method for discrete character strings using statistical information. The NPYLM is an extension of the Hierarchical Pitman-Yor Language Model (HPYLM), incorporating the word N-gram model. The NPYLM actualizes morphological analysis without dictionary data. The HPYLM improves robustness regarding unknown words and infrequently used words by smoothing the N-gram language model using the Pitman-Yor process, and enables appropriate segmentation into words.

The NPYLM and the HPYLM are described in detail in "Double Articulation Analyzer for Unsegmented Human Motion using Pitman-Yor Language model and Infinite Hidden Markov Model" (IEEE/SICE International Symposium on System Integration [2011]). Therefore further description thereof is omitted.

However, the above-described NPYLM is merely an example of segmentation of the code string. Segmentation may be performed by other methods. For example, driving words can be set in advance based on a code string generated when the vehicle is run through various driving aspects. A driving word dictionary can then be created. In addition, a database of the transition probability and the occurrence probability of each driving word can be created. The driving word dictionary, the transition probability database, and the occurrence probability database can be stored in the code combining section 7. An inputted code string can then be segmented into the most probable driving words with reference to the driving word dictionary, the transition probability database, and the occurrence probability database.

The code combining section 7 stores the results of segmentation of the driving code string into driving words in a driving word data storage section 8.

Here, generation of the code string in the encoding section 6 and segmentation into driving words in the code combining section 7 are performed by statistical processing. Therefore, the possibility of variations being included remains.

To eliminate to the utmost the effects of such variations, according to the present embodiment, first, the encoding section 6 generates a plurality of code strings having relatively high probability as code string candidates. The encoding section 6 then provides the code combining section 7 with the plurality of code string candidates. The code combining section 7 also calculates a plurality of driving-word segmentation results. The plurality of calculated driving-word segmentation results are stored in the driving word data storage section 8 as segmentation candidates.

The encoding section 6 may generate a single code string having the highest probability. The code combining section 7 may then calculate a plurality of driving-word segmentation results based on the single code string. Alternatively, the encoding section 6 may generate a plurality of code strings having relatively high probability as the code string candidates. The code combining section 7 may then calculate a single segmentation candidate or a plurality of segmentation candidates for each of the plurality of code string candidates. In any case, the code combining section 7 calculates a plurality of segmentation candidates.

A word changing location detecting section 9 ultimately decides the locations at which the driving words change (changing locations of the driving words) based on the above-described plurality of segmentation candidates. The word changing location detecting section 9 then outputs, to a playback speed calculating section 10, the string of driving words (driving word string) segmented at the changing locations that have been ultimately decided. The process performed by the word changing location detecting section 9 will be described with reference to FIG. 3A to FIG. 3D.

Figure 3A:
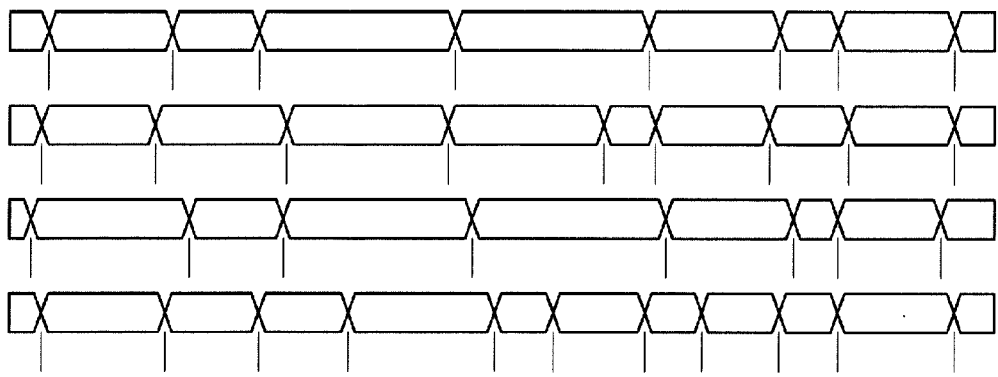
FIG. 3A to FIG. 3D show explanatory diagrams of a process for identifying the ultimate changing locations of the driving words.

First, the word changing location detecting section 9 reads out the plurality of driving word segmentation candidates stored in the driving word data storage section 8. FIG. 3A shows the plurality of driving word segmentation candidates read out in this way. In FIG. 3A, for convenience of description, four segmentation candidates are shown. However, the number of segmentation candidates is arbitrary.

Figure 3B:
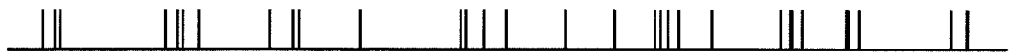
Figure 3C:
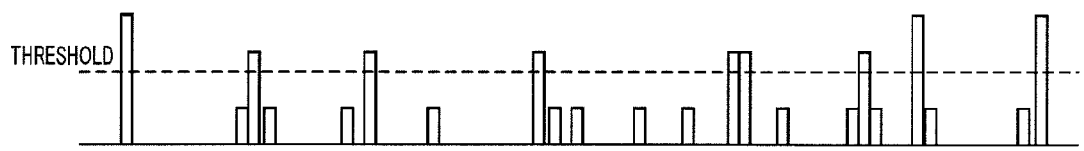
Figure 3D:
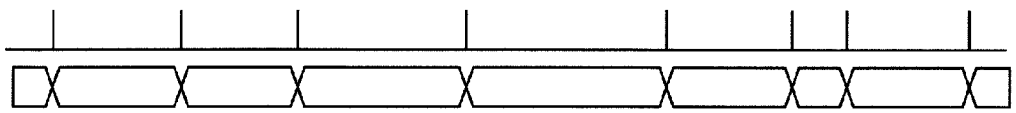

Then, the word changing location detecting section 9 detects the changing locations of the driving words in each segmentation candidate and plots the changing locations on the same time axis. FIG. 3B shows an example of the plotting results of the changing locations of the driving words in a plurality of segmentation candidates. Furthermore, when a plurality of plots belong within a predetermined time span based on the plotting results on the same time axis, the word changing location detecting section 9 calculates a total value of the number of plots, thereby creating a histogram as shown in FIG. 3C. In the histogram created in this way, the word changing location detecting section 9 ultimately decides the locations at which the total value of the number of plots exceed a predetermined threshold value as the changing locations of the driving words. FIG. 3D shows the driving word string segmented at the ultimately decided changing locations.

The playback speed calculating section 10 calculates the playback speed of the drive video stored in the drive video storage section 13 based on the driving word string provided by the word changing location detecting section 9.

The drive video is captured by the camera 11 that is mounted on the vehicle such as to be capable of capturing the surrounding environment of the vehicle (such as the conditions in the traveling direction of the vehicle). After an encoder 12 performs a predetermined encoding process (data compression based on moving picture experts group [MPEG] or the like), the drive video is stored in the drive video storage section 13 configured by a semiconductor storage device, such as a flash memory. The drive video such as this is useful for checking the driving state and the surrounding environment of the vehicle at a later time. However, when the video captured by the camera 11 is recorded as is without culling, a large-capacity storage device is required as the drive video storage section 13 and the recording period becomes limited.

Therefore, according to the present embodiment, the playback speed calculating section 10 identifies time periods during which the amount of information is larger and time periods during which the amount of information is smaller as vehicle states, based on the above-described driving word string. The playback speed calculating section 10 then calculates the playback speed appropriate for each time period. The process for calculating the playback speed will be described in detail hereafter.

The playback speed calculated for each time period in the driving word string by the playback speed calculating section 10 is outputted to a summarized moving image creating section 14. Here, the time at which the drive video that is continuously and chronologically stored in the drive video storage section 13 and the time at which the driving word string stored in the driving word data storage section 8 have been acquired are respectively recorded in the drive video and the drive word string using the same time information. Therefore, the summarized moving image creating section 14 can associate a time period corresponding to a calculated playback speed with a time period in the recorded drive video.

The summarized moving image creating section 14 culls the drive video of the relevant time period based on the playback speed for each time period calculated by the playback speed calculating section 10. The summarized moving image creating section 14 thereby creates a summarized moving image, and stores the summarized moving image in the summarized moving image storage section 15. This will be described in further detail hereafter.

The drive video is captured at a predetermined time interval by the camera 11 and stored in the drive video storage section 13. When all drive videos stored in the drive video storage section 13 are displayed at the time interval at which they have been captured by the camera 11, the moving image composed of the captured drive videos is played back at normal speed (1× speed).

On the other hand, when the playback speed is faster than 1× speed, not all of the original drive videos are required to be displayed. This will be described using a very simple example. For example, when the moving image composed of the original drive videos is played back at 10× speed, the images in the original drive video are merely required to be displayed at a rate of one image per 10 images. Therefore, when the playback speed is 10 times the speed of the original moving image, 90% of the original drive videos can be culled. Furthermore, when the playback speed is 30 times the speed of the original moving image, the images in the original drive video are merely required to be displayed at a rate of one image per 30 images. Therefore, about 97% of the original drive videos can be culled.

As described hereafter, the playback speed calculating section 10 calculates the playback speed of each time period to be faster than 1× speed. Therefore, the summarized moving image creating section 14 can reduce the amount of information of the summarized moving image from that of the original moving image by creating a summarized moving image composed of the culled drive videos of the time periods, in adherence to the playback speeds calculated per time period by the playback speed calculating section 10. Therefore, the storage capacity of the summarized moving image storage section 15 required for storing the summarized moving image can be reduced from that required in the past. Alternatively, a summarized moving image corresponding with a longer drive video can be stored. Like the drive video storage section 13, the summarized moving image storage section 15 can also be configured by a semiconductor storage device. The summarized moving image storage section 15, when configured by a semiconductor storage device, becomes suitable for mounting in a vehicle because the semiconductor storage device is superior in compactness and vibration resistance compared to hard disk drives and digital versatile disc (DVD) drives.

Next, the process for calculating the playback speed in the playback speed calculating section 10 will be described with reference to FIG. 4A to FIG. 4C.

Figure 4A:
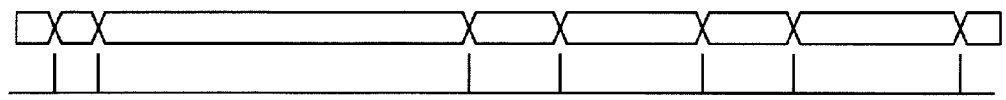
FIG. 4A to FIG. 4C show explanatory diagrams of a process for deciding a playback speed for each time period, based on a driving word string that is a string of segmented driving words.
Figure 4B:
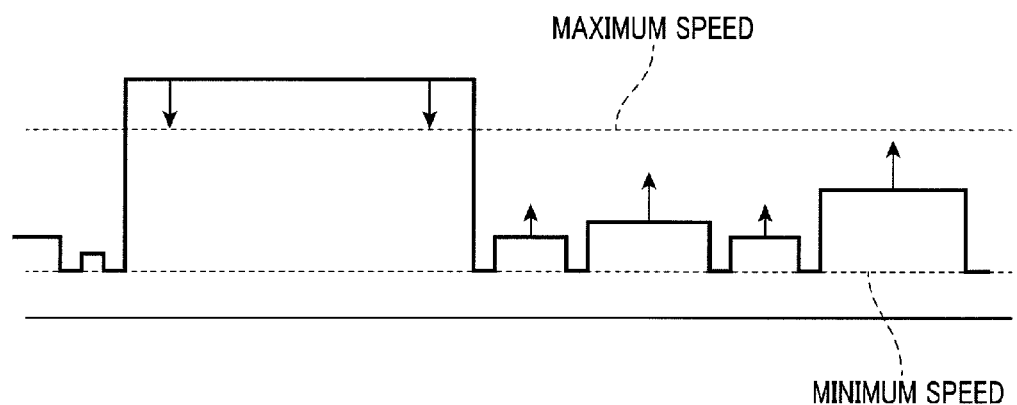
Figure 4C:
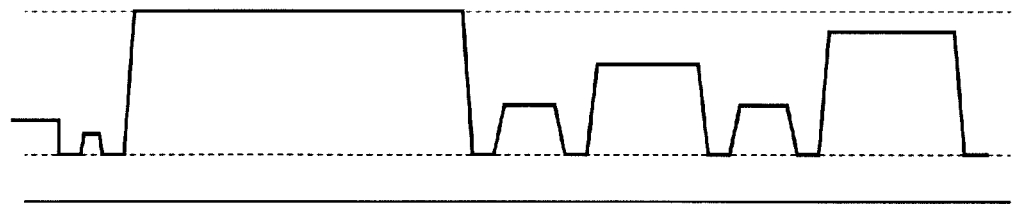

FIG. 4A shows an example of a driving word string provided by the word changing location detecting section 9. The playback speed calculating section 10 first extracts the changing locations of the driving words in the provided driving word string. Then, with reference to the changing locations, the playback speed calculating section 10 sets the playback speed of a time period preceding and following the changing location by a predetermined amount of time (such as a second before and after) to a predetermined minimum speed (such as 5× speed). The reason for this is as follows. The driving state changes at the changing location of the driving words. Therefore, the amount of information related to the vehicle state is considered to be the largest at this time.

Next, the playback speed calculating section 10 determines the length of each driving word based on the provided driving word string. Here, under a presumption that the amount of information related to the vehicle state expressed by each driving word is fixed, the time period corresponding to a short driving word can be considered to be a time period during which the amount of information related to the vehicle state (per unit of time) is larger than that of the time period corresponding to a long driving word. Therefore, the playback speed calculating section 10 calculates the playback speed of each time period such that the playback speed of the time period corresponding to a long driving word is faster than the playback speed of the time period corresponding to a short driving word. Therefore, for example, the playback speed calculating section 10 sets a multiplication result obtained by multiplying the length of the driving word with a predetermined constant of proportion as the playback speed of the time period corresponding to the driving word. The constant of proportion is set such that the playback speed of the time period corresponding to the shortest driving word is faster than at least the minimum speed, and the playing time of the summarized moving image is shorted to a predetermined percentage (such as 5%) of the duration of the original moving image.

In this way, the playback speed of the time period before and after the changing location of the driving words and the playback speed of each time period corresponding to each driving word are calculated. However, when the calculated playback speeds include a playback speed that exceeds a predetermined maximum speed (such as 30× speed) as shown in FIG. 4B, the playback speed is restricted to the maximum speed. This is because, if the playback speed is excessively increased, the content may become difficult to understand at viewing.

However, when some of the playback speeds among the calculated playback speeds exceed the maximum speed and the playback speeds are restricted to the maximum speed, the playing time of the summarized moving image may exceed the predetermined percentage of the duration of the original moving image. In such instances, as shown in FIG. 4B, the total playing time of the summarized moving image can be shortened to the predetermined percentage of the duration of the original moving image by a predetermined multiplying factor being multiplied with or a predetermined value being added to at least some (or all) of the playback speeds that have not reached the maximum speed.

In addition, when the playback speeds differ between adjacent time periods, the viewer finds the image very difficult to view or experiences discomfort when the playback speed instantaneously changes. Therefore, to suppress sudden changes in playback speed, the playback speed calculating section 10 calculates the playback speeds so that the playback speed changes gradually when the playback speeds differ between adjacent time periods. FIG. 4C shows an example of the playback speed for each time period that is ultimately calculated by the playback speed calculating section 10.

When the summarized moving image creating section 14 creates the summarized moving image, the original drive videos from which the summarized moving image has been created are no longer necessary. Therefore, when creation of the summarized moving image is completed, the summarized moving image creating section 14 allows the drive video storage section 13 to rewrite and store a new drive video in the area in which the original drive videos are stored. In this way, the drive video storage section 13 merely temporarily stores the drive videos captured by the camera 11 until the summarized moving image is created. Therefore, a large-capacity drive video storage section 13 is not required to be used.

As described above, in the drive video recording system 100 according to the present embodiment, a summarized moving image is recorded that has been created by culling an original moving image composed of a drive video that have been continuously captured. Therefore, the drive video of the overall vehicle travel can be checked through the summarized moving image. In addition, the storage capacity for recording the summarized moving image can be reduced from that of the past. Furthermore, when the original moving image is culled and the summarized moving image created, the playback speed of the time period during which the amount of information is larger as a vehicle state is made relatively slow, and the playback speed of the time period during which the amount of information is smaller is made relatively fast. Therefore, during playback of the summarized moving image, vehicle states that are considered important can be played back relatively slowly with emphasis. Inspection of such vehicle states and the like can be facilitated.

In addition, according to the present embodiment, although differentiation is made depending on the amount of information related to the vehicle state, on the whole, the playback speed of the summarized moving image is faster than that of the original moving image. Therefore, the amount of time required to view the drive video can be significantly shortened. Regarding this point, in above-described JP-A-2011-146860 as well, an attempt is made to shorten the viewing time by images being played back such that images having a low degree of necessity for the user are skipped. However, because the degree of similarity with the information at the skip-start time set by the user and a threshold value are used to determine the portion to be skipped, portions actually having a low degree of necessity while not having similarity with the information at the skip-start time (such as intermittent start-up and stop during a traffic jam) are not skipped. Furthermore, because there are only two variations in playback speed, i.e. that when images are skipped and that when images are not skipped, in some instances, the images are played back over an excessively long amount of time in relation to the actual degree of importance. For such reasons, the shortening of viewing time of the drive video in the device in JP-A-2011-146860 is likely to be insufficient.

As an aspect of an application using the drive video recording system 100 according to the present embodiment, an example of moving image summary software is shown in FIG. 5. The application user can designate, in the drive video recording device 50 according to the present embodiment, the maximum speed and the minimum speed of the playback speed, as well as the percentage of the total playing time of the summarized moving image. The drive video recording device 50 uses these values and creates a summarized moving image according to the above-described embodiment. The summarized moving image created in this way can shorten the time required to view the drive video, while enabling the application user to check the state of the overall vehicle travel.

The above-described embodiment is preferable for carrying out the present invention. However, the present invention is not limited to the above-described embodiment. Various modifications can be made without departing from the spirit of the present invention.

For example, according to the above-described embodiment, the playback speed of a time period corresponding to a driving word is calculated based on the length of the driving word. However, for example, the playback speed of the time period before and after the changing location of each driving word can be set to the minimum speed, and the playback speed of the time period corresponding to each driving word can be uniformly set to the maximum speed. In addition, according to the above-described embodiment, a multiplication result obtained by the length of the driving word being multiplied by a predetermined constant of proportion is set as the playback speed of the time period corresponding to the driving word. However, for example, a logarithm of the length of a driving word can be obtained and set as the playback speed of the time period corresponding to the driving word. Alternatively, instead of obtaining the logarithm of the length of the driving word, other increasing functions may be applied to the length of the driving word.

Furthermore, according to the above-described embodiment, a restriction is set such that the total playing time of the summarized moving image equivalent to a predetermined percentage of the duration of the original moving image. However, such restrictions regarding the total playing time is not required to be set. In this instance, when a playback speed exceeding the maximum speed is present, the playback speed is simply restricted to the maximum speed. Other processing operations are not required.

Furthermore, according to the above-described embodiment, regarding the information related to the operations by the driver, the behavior of the vehicle, and the state of the driver, derivative information equivalent to the derivative of the detected information is calculated. The derivative information is then stored in the vehicle data storage section 5 together with the detected information. However, only the information detected by the various sensors may be used, without the derivative information being stored together with the detected information.

Still further, according to the above-described embodiment, to eliminate to the utmost the effect of variations in the generation of code strings in the encoding section 6 and in segmentation into driving words in the code combining section 7, the encoding section 6 generates a plurality of code string candidates and the code combining section 7 calculates a plurality of driving word segmentation results. However, the encoding section 6 and the code combining section 7 may respectively calculate a single code string candidate and a single driving word segmentation result. In this instance, the word changing location detecting section 9 can use the calculated driving word segmentation result as the ultimately decided driving word string.

Furthermore, according to the above-described embodiment, when the summarized moving image is created by the summarized moving image creating section 14, the summarized moving image creating section 14 allows the drive video storage section 13 to rewrite and store a new drive video in the area in which the original drive video is stored. However, the drive video storage section 13 is not required to rewrite the new drive video in the area in which the original drive video is stored. In this instance as well, an advantage is achieved in that the time required to view the summarized moving image created by the summarized moving image creating section 14 can be shortened.

(Correlation Between Terms)

The encoding section 6 according to the embodiment is equivalent to a "code string generating section."

The code combining section 7 according to the embodiment is equivalent to a "segmenting section".

The vehicle data collecting section 4 and the vehicle data storage section 5 according to the embodiment configure a "vehicle state collecting section 40".

The drive video storage section 13 according to the embodiment is equivalent to a "first storage section".

The summarized moving image recording section 15 according to the present invention is equivalent to a "second storage section".

The encoding section 6, the code combining section 7, the driving word data storage section 8, the word changing location detecting section 9, the playback speed calculating section 10, and the summarized moving image creating section 14, according to the embodiment are an example of a "summarized moving image creating and recording section 30".

The accelerator sensor 1, the brake sensor 2, and the steering sensor 3, according to the embodiment are an example of a "information detecting device 20".

What is claimed is:

1. A drive video recording device, comprising:
a video encoding section that encodes a video indicating a surrounding environment of the vehicle, wherein the video is continuously captured by an imaging device mounted in a vehicle and inputted thereto;
a first storage section for storing the video encoded by the video encoding section;
a second storage section;
a vehicle state collecting section that collects information related to vehicle states including at least one of operations by a driver, the behavior of the vehicle, and the state of the driver; and
a summarized moving image creating and recording section that identifies time periods during which an amount of information collected by the vehicle state collecting section is larger and time periods during which the amount of information is smaller as vehicle states in the video stored in the first storage section, creates a summarized moving image in which the video stored by the first storage section is culled such that a playback speed of the video of the time period during which the amount of information is smaller is faster than a playback speed of the video of the time period during which the amount of information is larger, and stores the summarized moving image in the second storage section.

2. The drive video recording device according to claim 1, wherein the summarized moving image creating and recording section provides
a code string generating section that generates a code string by grouping the information continuously and chronologically detected by the information detecting device per vehicle state serving as a grouping unit, and expressing the vehicle states using codes corresponding to the vehicle states; and
a segmenting section that segments the code string generated by the code string generating section into driving words expressing predetermined driving states, and thereby the summarized moving image creating and recording section identifies, from the string of driving words segmented by the segmenting section, time periods during which the amount of information is larger and time periods during which the amount of information is smaller as vehicle states.

3. The drive video recording device according to claim 2, wherein the summarized moving image creating and recording section regards a time period before and after the driving words is switched as a time period during which an amount of information related to the vehicle state per unit of time is more than that of a time period on which a same word is carried.

4. The drive video recording device according to claim 3, wherein the summarized moving image creating and recording section creates, such that a play back speed of a video of the time period before and after the driving words is switched becomes a predetermined minimum speed, the summarized moving image by culling the video of the time period.

5. The drive video recording device according to claim 3, wherein the summarized moving image creating and recording section regards a time period corresponding to a short driving word as a time period during which an amount of information related to the vehicle state per unit of time is more than that of a time period corresponding to a longer driving word.

6. The drive video recording device according to claim 5, wherein the summarized moving image creating and recording section sets a multiplication result obtained by multiplying the length of the driving word with a predetermined constant of proportion as the playback speed of the time period corresponding to the driving word, and thereby culls the inputted video so as to correspond to the play back speed and creates the summarized moving image.

7. The drive video recording device according to claim 6, wherein the summarized moving image creating and recording section sets a percentage against a duration of the original moving image such that a total playing time of the summarized moving image is shortened to said percentage.

8. The drive video recording device according to claim 6, wherein the summarized moving image creating and recording section, when a calculated playback speed calculated by the summarized moving image creating and recording section includes a playback speed that exceeds a predetermined maximum speed, restricts the playback speed to the maximum speed.

9. The drive video recording device according to claim 8, wherein the summarized moving image creating and recording section sets a percentage against a duration of the original moving image such that a total playing time of the summarized moving image is shortened to said percentage.

10. The drive video recording device according to claim 9, wherein the summarized moving image creating and recording section culls the inputted video and thereby creates the summarized moving image so that the playback speed changes gradually when the playback speed differs between adjacent time periods.

11. The drive video recording device according to claim 10, wherein the code string generating section generates a plurality of code string candidates in relation to said code string, and the segmenting section determines a plurality of segmentation candidates that are segmented into driving words based on the plurality of code string candidates, and segments the driving words by identifying changing locations of the driving words in more than predetermined number of segmentation candidates as ultimate segments.

12. The drive video recording device according to claim 11, wherein the segmenting section calculates a plurality of segmentation candidates in relation to each plurality of code string candidates which are generated by the code string generating section.

13. The drive video recording device according to claim 2, wherein the summarized moving image creating and recording section regards a time period corresponding to a short driving word as a time period during which an amount of information related to the vehicle state per unit of time is more than that of a time period corresponding to a longer driving word.

14. The drive video recording device according to claim 13, wherein the summarized moving image creating and recording section sets a multiplication result obtained by multiplying the length of the driving word with a predetermined constant of proportion as the playback speed of the time period corresponding to the driving word, and thereby culls the inputted video so as to correspond to the play back speed and creates the summarized moving image.

15. The drive video recording device according to claim 14, wherein the summarized moving image creating and recording section sets a percentage against a duration of the original moving image such that a total playing time of the summarized moving image is shortened to said percentage.

16. The drive video recording device according to claim 14, wherein the summarized moving image creating and recording section, when a calculated playback speed calculated by the summarized moving image creating and recording section includes a playback speed that exceeds a predetermined maximum speed, restricts the playback speed to the maximum speed.

17. The drive video recording device according to claim 16, wherein the summarized moving image creating and recording section sets a percentage against a duration of the original moving image such that a total playing time of the summarized moving image is shortened to said percentage.

18. A drive video recording system, comprising:
an information detecting device that detects at least one type of information related to vehicle states including at least one of operations by a driver, the behavior of a vehicle, and the state of the driver;
an imaging device that is provided in the vehicle and continuously captures a video indicating the surrounding environment of the vehicle; and
a drive video recording device, wherein the drive video recording device includes a video encoding section that encodes a video that is captured by the imaging device and inputted, the video indicating the surrounding environment of the vehicle; a first storage section for storing the encoded video; a second storage section; a code string generating section that generates a code string by grouping the information continuously and chronologically detected by the information detecting device per vehicle state serving as a grouping unit, and expressing the vehicle states using codes corresponding to the vehicle states; and a segmenting section that segments the code string generated by the code string generating section into driving words expressing predetermined driving states, and wherein the drive video recording device, from the string of driving words segmented by the segmenting section, identifies time periods during which an amount of information detected by the information detecting device is larger and time periods during which the amount of information is smaller as vehicle states, creates a summarized moving image in which the video captured by the imaging device is culled such that a playback speed of the video of the time period during which the amount of information is smaller is faster than a playback speed of the video of the time period during which the amount of information is larger, and records the summarized moving image in the second storage section.

19. A summarized moving image creating device, comprising:
- a video encoding section that encodes a video that is continuously captured by an imaging device mounted in a vehicle and inputted, the video indicating the surrounding environment of the vehicle;
- a first storage section for storing the video encoded by the video encoding section;
- a vehicle state collecting section that collects information related to vehicle states including at least one of operations by a driver, the behavior of the vehicle, and the state of the driver; and
- a summarized moving image creating and recording section that identifies time periods during which an amount of information collected by the vehicle state collecting section is larger and time periods during which the amount of information is smaller as vehicle states in the video stored in the first storage section, creates a summarized moving image in which the video stored by the first storage section is culled such that a playback speed of the video of the time period during which the amount of information is smaller is faster than a playback speed of the video of the time period during which the amount of information is larger, and stores the summarized moving image in the second storage section.

20. A drive video recording method, comprising:
- encoding a video indicating a surrounding environment of the vehicle, wherein the video is continuously captured by an imaging device mounted in a vehicle;
- collecting information related to vehicle states including at least one of operations by a driver, the behavior of the vehicle, and the state of the driver;
- identifying time periods during which an amount of information collected in the collecting step is larger and time periods during which the amount of information is smaller as vehicle states in the video stored in the first storage section;
- creating a summarized moving image in which the video encoded in the encoding step is culled such that a playback speed of the video of the time period during which the amount of information is smaller is faster than a playback speed of the video of the time period during which the amount of information is larger; and
- storing the summarized moving image in the second storage section.

* * * * *